United States Patent
Anderson et al.

(10) Patent No.: US 7,056,013 B2
(45) Date of Patent: Jun. 6, 2006

(54) SENSOR ARRANGEMENT HAVING AN AIR INFLOW PATTERN FOR PREVENTING DIRECT DEBRIS IMPACT

(75) Inventors: Peter Anderson, Georgetown (CA); Roger R. Sanger, Fountain Valley, CA (US); Timothy J. Lippold, Huntington Beach, CA (US); Paul J. Cairns, Huntington Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/813,706

(22) Filed: Mar. 31, 2004

(65) Prior Publication Data

US 2005/0089082 A1  Apr. 28, 2005

Related U.S. Application Data

(60) Provisional application No. 60/514,688, filed on Oct. 28, 2003.

(51) Int. Cl.
*G01K 1/16* (2006.01)
*G01K 13/02* (2006.01)

(52) U.S. Cl. ............... 374/138; 374/148; 374/208
(58) Field of Classification Search ............ 374/138, 374/141, 208, 147, 148, 179, 100
See application file for complete search history.

(56) References Cited

U.S. PATENT DOCUMENTS

| | | | |
|---|---|---|---|
| 2,875,614 A | | 3/1959 | Dobrin et al. |
| 2,900,821 A | * | 8/1959 | Rich .......................... 374/138 |
| 2,928,279 A | * | 3/1960 | Schober ...................... 374/138 |
| 2,970,475 A | * | 2/1961 | Werner ....................... 374/138 |
| 3,673,870 A | * | 7/1972 | Jalbert ........................ 374/138 |
| 4,152,938 A | * | 5/1979 | Danninger ................... 374/138 |
| 4,403,872 A | * | 9/1983 | DeLeo ........................ 374/138 |
| 4,412,090 A | * | 10/1983 | Kawate et al. .............. 136/230 |
| 4,423,967 A | * | 1/1984 | Mouton ...................... 374/138 |
| 4,549,706 A | * | 10/1985 | Stickney ..................... 244/1 R |
| 4,575,705 A | | 3/1986 | Gotcher |
| 4,599,889 A | * | 7/1986 | Pateras Pescara de Castelluccio .......... 73/25.01 |
| 4,821,566 A | * | 4/1989 | Johnston et al. ............ 73/178 R |
| 4,941,437 A | * | 7/1990 | Suzuki et al. ............. 123/41.12 |
| 5,064,604 A | * | 11/1991 | Barton ........................ 376/246 |
| 5,116,137 A | * | 5/1992 | Xiong et al. ................ 374/132 |

(Continued)

FOREIGN PATENT DOCUMENTS

JP  62043528 A * 2/1987

*Primary Examiner*—Gail Verbitsky
(74) *Attorney, Agent, or Firm*—Birch, Stewart, Kolasch & Birch, LLP

(57) ABSTRACT

A temperature sensor arrangement (100, 300) includes a sensor cavity (150), a temperature sensing element (330) being positioned along a center line (140, 340) of the sensor cavity (150) and generating a signal indicating temperature of air flowing thereto, and a generally cylindrical outer casing (105, 305) surrounding the sensor cavity (150). In one embodiment, the outer casing (105) includes a pattern of flow passages (110) for allowing air flow to the temperature sensing element (330) in the sensor cavity (150), the flow passages (110) being angled such that there is no direct line of air flow from an exterior of the outer casing (105) to the sensing element (330). In another embodiment, the flow passages (310) are arranged in an offset pattern relative to a center line (340) of the housing cavity (150), such that there is no direct line of air flow from an exterior of the outer casing (305) to the sensing element (330).

24 Claims, 3 Drawing Sheets

U.S. PATENT DOCUMENTS

| | | | |
|---|---|---|---|
| 5,137,320 A * | 8/1992 | Christensen | 296/3 |
| 5,348,395 A * | 9/1994 | Corr et al. | 374/135 |
| 5,462,359 A * | 10/1995 | Reichl et al. | 374/148 |
| 5,628,565 A | 5/1997 | Hagen et al. | |
| 5,653,538 A | 8/1997 | Phillips | |
| 5,662,418 A * | 9/1997 | Deak et al. | 374/144 |
| RE35,674 E * | 12/1997 | Pustell | 136/231 |
| 5,834,657 A * | 11/1998 | Clawson et al. | 73/863.81 |
| 6,076,963 A * | 6/2000 | Menzies et al. | 374/138 |
| 6,224,255 B1 * | 5/2001 | Stadelmayer et al. | 374/152 |
| 6,270,253 B1 * | 8/2001 | Keller | 374/138 |
| 6,672,152 B1 * | 1/2004 | Rouse et al. | 73/170.02 |
| 6,762,671 B1 * | 7/2004 | Nelson | 338/25 |
| 6,817,240 B1 * | 11/2004 | Collot et al. | 73/170.02 |
| 6,827,485 B1 * | 12/2004 | Isebrand | 374/141 |
| 6,840,672 B1 * | 1/2005 | Ice et al. | 374/139 |
| 2002/0131474 A1 * | 9/2002 | Suga | 374/138 |
| 2003/0126952 A1 | 7/2003 | Roeckel et al. | |
| 2005/0058179 A1 * | 3/2005 | Phipps | 374/208 |

\* cited by examiner

SENSOR ARRANGEMENT HAVING AN AIR INFLOW PATTERN FOR PREVENTING DIRECT DEBRIS IMPACT

RELATED APPLICATION

This application claims priority under 35 U.S.C. §119(e) of U.S. Provisional Application Ser. No. 60/514,688 filed on Oct. 28, 2003, the entire contents of which are herein incorporated by reference.

FIELD OF THE INVENTION

This invention relates to temperature sensors, and more particularly to a temperature sensor arrangement in which the sensor outer casing has a pattern of air flow passages arranged to allow air inflow to a temperature sensing element while preventing airborne debris from directly impacting the temperature sensing element.

BACKGROUND OF THE INVENTION

A known temperature sensor arrangement measures the temperature of air flowing in a passageway and includes a generally cylindrical housing having a cavity in which a sensing element is positioned along a center line. The outer casing of one known sensor arrangement includes slots carved out on the center line to allow air inflow to the sensing element. One implementation for such a known temperature sensing arrangement is in an aircraft bleed air system, which carries air from a gas turbine engine for pressurization, compartment temperature control, and wing anti-icing systems. Although the slot arrangement of this known temperature sensor device protects the sensing element from large debris, the inventors of this application have found that smaller debris (e.g., sand) passing through the gas turbine engine may cause damage to the sensing element due to the debris impacting the sensor element. Design constraints typically preclude moving the sensor to a safer location, clocking the sensor, or changing the sensor time constant to the point that a pneumatic system controller change would be required.

In one aspect, the present invention addresses drawbacks of the above-described temperature sensor design by incorporating a flow passage pattern that substantially reduces or eliminate damage due to debris impacting the sensor, thereby improving reliability and extending operation life of the temperature sensor.

SUMMARY OF THE INVENTION

The present invention, in one aspect, is a temperature sensor arrangement designed to allow air inflow to a temperature sensing element through a series of air flow passages while preventing/mitigating the effect of debris impacting the sensing element. In one embodiment, the present invention is temperature sensor arrangement comprising: a sensor cavity, a temperature sensing element being positioned along a center line of the sensor cavity and generating a signal indicating temperature of air flowing thereto; and a generally cylindrical outer casing surrounding the sensor cavity, the outer casing including a pattern of flow passages for allowing air flow to the temperature sensing element in the sensor cavity, the flow passages being angled such that there is no direct line of air flow from an exterior of the outer casing to the sensing element.

In an alternative embodiment, the present invention is a temperature sensor arrangement comprising: a sensor cavity, a temperature sensing element being positioned along a center line of the sensor cavity and generating a signal indicating temperature of air flowing thereto; and a generally cylindrical outer casing surrounding the sensor cavity, the outer casing including a pattern of flow passages for allowing air flow to the temperature sensing element in the sensor cavity, the flow passages being offset relative to a center line of the housing cavity such that there is no direct line of air flow from an exterior of said outer casing to the sensing element.

BRIEF DESCRIPTION OF THE DRAWINGS

Additional aspects and advantages of the present invention will become apparent from the following detailed description taken in conjunction with the accompanying drawings, in which.

DESCRIPTION OF THE INVENTION

In one aspect, the present invention is a temperature sensor arrangement designed to allow air inflow to a temperature sensing element through a series of passages in an outer casing while preventing/mitigating the effect of debris impacting the sensor. Additional aspects of the present invention will become apparent from the following description, with reference to the appended figures.

FIGS. 1A–1D illustrate a temperature sensor arrangement according to a first embodiment of the present invention. According to the first embodiment, the temperature sensor arrangement 100 includes a generally cylindrical outer casing 105 with a pattern of openings (holes in this embodiment) 110 for allowing air inflow to a temperature sensing element positioned along a center line 140 in a cavity 150.

The temperature sensor arrangement 100 of the first embodiment may be implemented for use in an air duct so as to be positioned with the outer casing generally perpendicular to the air flow. In this way, the pattern of holes 110 allows air flow to the sensing element, which is positioned on the center line 140.

Figure 1A:
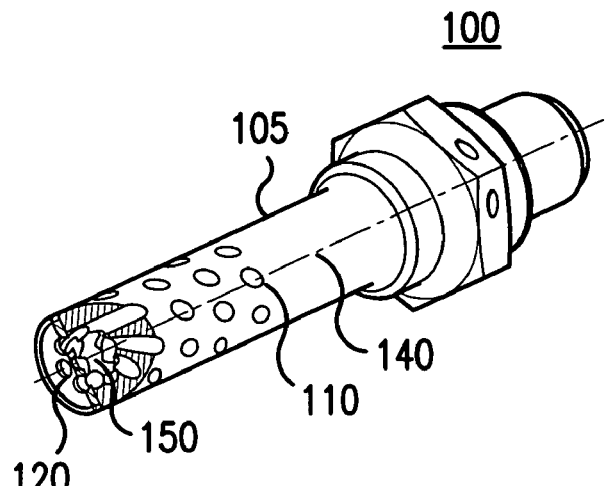
FIG. 1A is an isometric and cross-sectional view of a temperature sensor arrangement according to a first embodiment of the present invention.
Figure 1B:
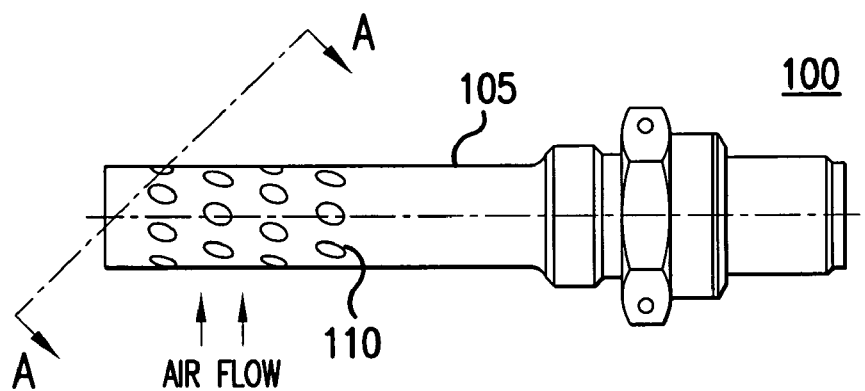
FIG. 1B is a side view of the temperature sensor arrangement according to the first embodiment of the present invention.
Figure 1C:
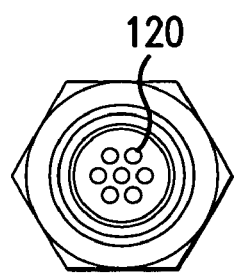
FIG. 1C is a front view of the temperature sensor arrangement according to the first embodiment of the present invention.
Figure 1D:
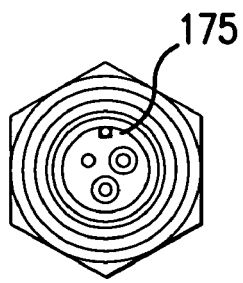
FIG. 1D is a rear view of the temperature sensor arrangement according to the first embodiment of the present invention.

FIG. 1A is an isometric and cross-sectional view of the temperature sensor arrangement 100 according to the first embodiment. FIG. 1A illustrates a cross-section along line A—A (FIG. 1B). In the first embodiment, the holes 110 are angled to prevent airborne debris from directly impacting the temperature sensing element. In other words, there is no direct "line of sight" through the angled holes to the sensing element so that debris entering a hole 110 will impact at least one surface prior to entering the housing cavity 150, thus dissipating kinetic energy of the debris particles. The specific angle for the holes 110 may vary, depending for example on the thickness of the casing 105. In one implementation, the holes 110 may be equally spaced and drilled on a 45° angle. As shown in the isometric view of FIG. 1A and the front view of FIG. 1C, the temperature sensing arrangement 100 according to the first embodiment also includes a plurality of holes 120 in the front face to allow debris to exit the housing cavity 150. The rear surface of the temperature sensor arrangement 100 may include standard electrical connections 175 to output temperature measurements, such as shown in the rear view of FIG. 1D.

Figure 2:
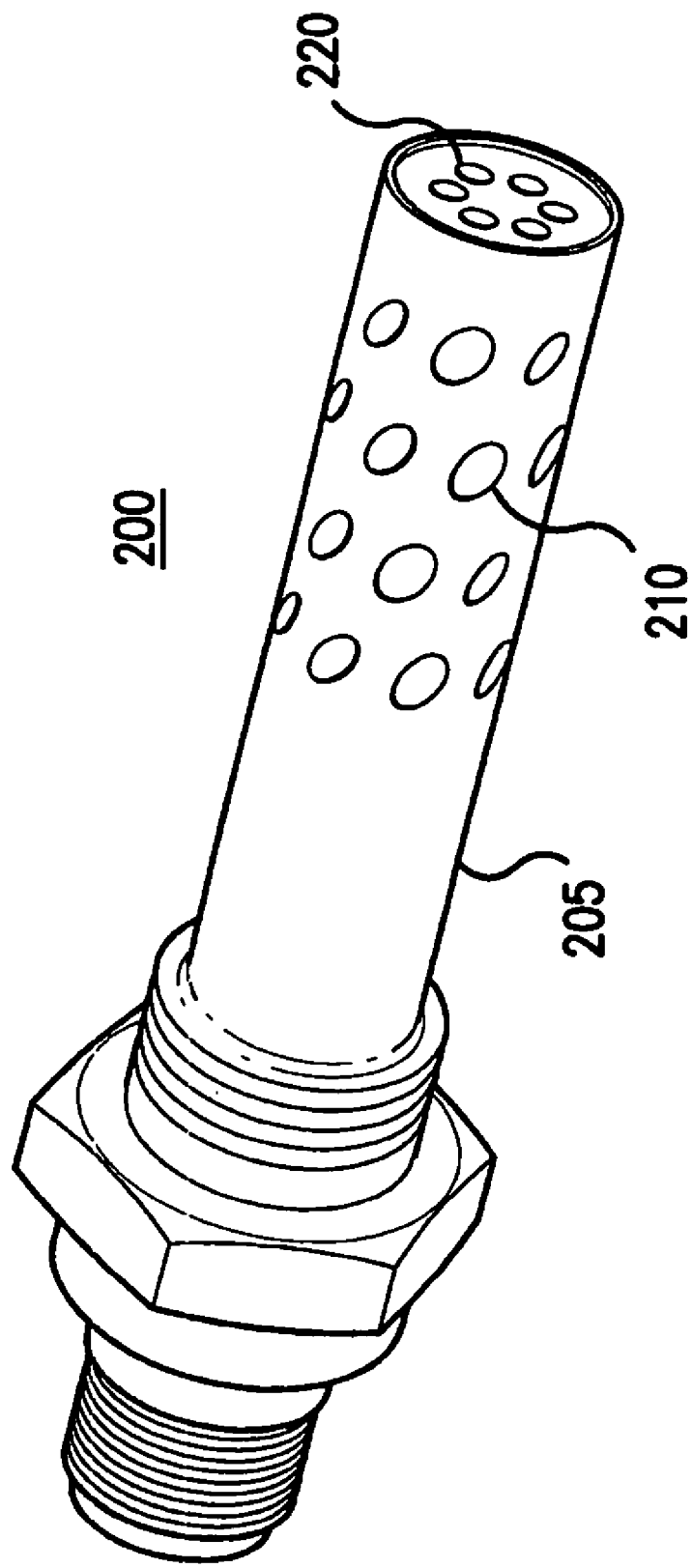
FIG. 2 is an additional isometric view of a temperature sensor arrangement in accordance with the first embodiment of the present invention.

FIG. 2 is an additional isometric view of a temperature sensor arrangement 200 consistent with the first embodiment of the present invention, including a generally cylindrical outer casing 205, a pattern of angled air inflow holes 210 and front-face holes 220 for allowing debris to exit the housing cavity.

Figure 3A:
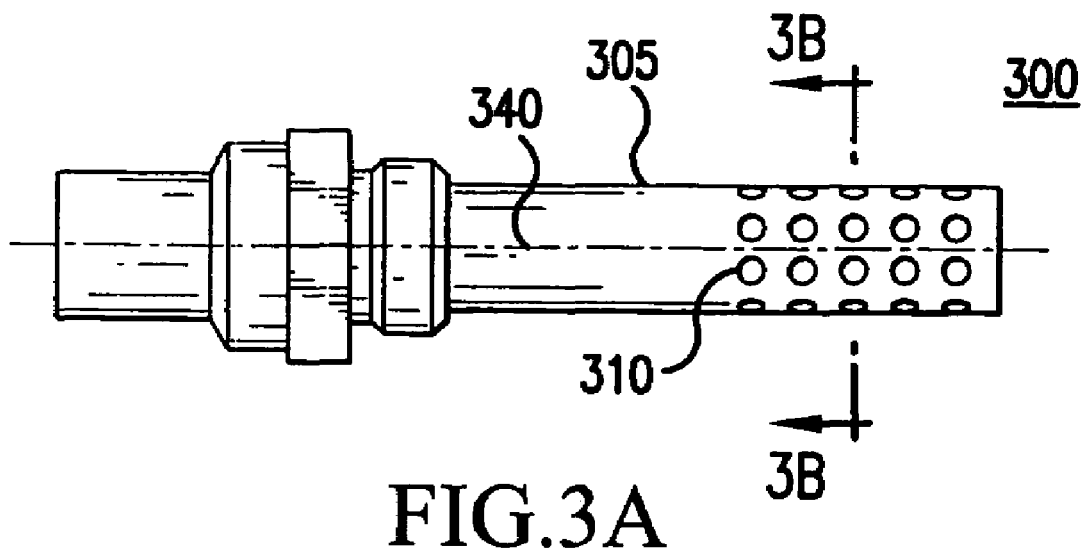
FIG. 3A is a side view of a temperature sensor arrangement according to a second embodiment of the present invention.
Figure 3B:
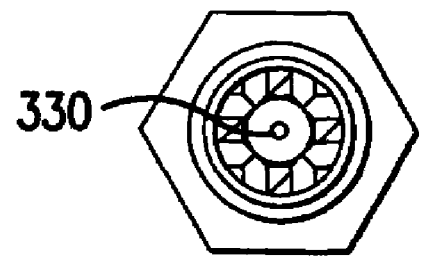
FIG. 3B is a cross-sectional view of the temperature sensor arrangement according to the second embodiment of the present invention.

FIGS. 3A–3B illustrate a temperature sensor arrangement 300 according to a second embodiment of the present invention. As shown in FIG. 3A, the temperature sensor arrangement 300 of the second embodiment includes a generally cylindrical outer casing 305 designed to allow air inflow through a series of holes 310 that are generally perpendicular to the sensing element 330 centered in a housing cavity (e.g., same as the cavity 150 in FIG. 1A), the holes 310 being offset from the center line 340 of the probe by a distance greater than the diameter of the sensing element 330. With this arrangement, direct flow impingement on the sensing element 330 is minimal or non-existent, depending on the sensor orientation. FIG. 3B illustrates a cross-sectional view, along cross section 3B-3B shown in FIG. 3A, showing the casing material as cross-hatched. As shown in FIG. 3B, there is no direct line of sight through the holes 310 to the sensing element 330, such that direct impact of airborne debris to the temperature sensing element is minimized. The temperature sensor arrangement 300 of the second embodiment may have a rear and front configuration like that shown in FIGS. 1D and 1C, respectively. Advantages of aspects of the above-described embodiments are described below.

The above-described embodiments allow the temperature sensor to more reliably operate in an environment that contains debris, by minimizing or eliminating impact damage on the temperature sensing element of the sensor. Design variations on these concepts include flow passage hole diameters and sensor casing wall thickness.

The sensor outer casing is preferably a metallic part. A preferred material is 347 Stainless Steel, for consistency with the other sub-components of the temperature sensor. Other grades of stainless steel and other metals may also be used, based on their suitability for operation in a high temperature (e.g., up to 1200° F.) and high stress environment, and compatibility with the other components of the sensor. The sensor outer casing may be manufactured through a machining process or as a casting.

In one specific implementation, the above-described embodiments are designed to improve reliability and extend operational life of the temperature sensor by protecting the temperature sensing element from debris damage in high temperature bleed air environments such as can be found in aircraft implementations. The invention may be designed to be a sub-component of a temperature sensor system, and may be applied to the temperature sensor for use in various applications, including (but not limited to) pneumatic bleed systems of commercial aircraft.

The above-described embodiments do not require unique or specific orientation of the sensor within a flow stream (a.k.a., "clocking") in order to function. These embodiments are designed to protrude into the flow stream through a hole in the side of an existing duct, such as a typical sensor mounting boss in an aircraft ducting. This allows it to be easily retrofitted into existing temperature sensor installations. In other words, custom designed duct installation is not required.

The housing is designed to absorb energy of solid matter particles as well as to deflect them away from the sensor probe, while maintaining sufficient airflow past the center probe so as to provide a response time comparable to a conventionally shielded or unshielded temperature sensor. Even if solid matter particles eventually come in contact with the sensing element, the particles lack sufficient energy to damage the sensing element. The present invention allows the hard particles to enter the housing in a state that does not damage the sensing element. Provision is made to evacuate the particles in question.

Although the temperature sensor arrangement according to aspects of the present invention may be installed in a bleed air system of an aircraft, other implementations of the temperature sensor arrangement are possible such as:

Temperature sensing on aircraft systems where ice impingement is a risk (i.e. downstream of an air conditioning pack);

Ram inlet temperature sensing on aircraft;

Air intakes on vehicles such as cars, tanks, and recreational vehicles.

We claim:

1. A temperature sensor arrangement comprising:
   a sensor cavity, a temperature sensing element being positioned along a center line of said sensor cavity and generating a signal indicating temperature of air flowing thereto; and
   a generally cylindrical outer casing surrounding said sensor cavity, said outer casing including a pattern of air inflow passages arranged on a tubular surface of said outer casing for allowing air flow to said temperature sensing element in said sensor cavity so that said temperature sensing element senses temperature of air flowing generally transverse to said outer casing and entering said senor cavity via said pattern of air inflow passages, said pattern of air inflow passages overlapping said temperature sensing element in a direction extending radially from said center line of said sensor cavity, said direction being generally transverse to the direction of air flow to said temperature sensor arrangement, said air inflow passages being angled such that there is no direct line of air flow from an exterior of said outer casing to said sensing element.

2. The temperature sensor arrangement according to claim 1, wherein said angled air inflow passages prevent airborne debris from directly impacting said temperature sensing element.

3. The temperature sensor arrangement according to claim 1, wherein said air inflow passages are generally circular holes.

4. The temperature sensor arrangement according to claim 1, further comprising:
a front face on one end of said generally cylindrical outer casing, said front face including a pattern of openings for evacuating debris from said sensor cavity.

5. The temperature sensor arrangement according to claim 1, wherein said temperature sensor arrangement is configured to protrude into an air passage, such that said generally cylindrical outer casing is substantially perpendicular to the airflow.

6. The temperature sensor arrangement according to claim 5, wherein said air passage is a duct of an aircraft.

7. The temperature sensor arrangement according to claim 6, wherein said aircraft duct is part of an aircraft bleed air system.

8. The temperature sensor arrangement according to claim 1, wherein said generally cylindrical outer casing is formed of stainless steel.

9. The temperature sensor arrangement according to claim 1, wherein said pattern of air inflow passages is formed by drilling into said generally cylindrical outer casing at an angle that is a function of a thickness dimension of said outer casing.

10. The temperature sensor arrangement according to claim 1, wherein the air inflow passages in said generally cylindrical outer casing are equally spaced.

11. A temperature sensor arrangement comprising:
a sensor cavity, a temperature sensing element being positioned along a center line of said sensor cavity and generating a signal indicating temperature of air flowing thereto; and
a generally cylindrical outer casing surrounding said sensor cavity, said outer casing including a pattern of air inflow passages arranged on a tubular surface of said outer casing for allowing air flow to said temperature sensing element in said sensor cavity so that said temperature sensing element senses temperature of air flowing generally transverse to said outer casing and entering said senor cavity via said pattern of air inflow passages, said pattern of air inflow passages overlapping said temperature sensing element in a direction extending radially from said center line of said sensor cavity, said direction being generally transverse to the direction of air flow to said temperature sensor arrangement, said air inflow passages being offset relative to a center line of the housing cavity such that there is no direct line of air flow from an exterior of said outer casing to said sensing element.

12. The temperature sensor arrangement according to claim 11, wherein said pattern of offset air inflow passages prevents airborne debris from directly impacting said temperature sensing element.

13. The temperature sensor arrangement according to claim 11, wherein said air inflow passages are generally circular holes.

14. The temperature sensor arrangement according to claim 11, further comprising:
a front face on one end of said generally cylindrical outer casing, said front face including a pattern of openings for evacuating debris from said sensor cavity.

15. The temperature sensor arrangement according to claim 11, wherein said temperature sensor arrangement is configured to protrude into an air passage, such that said generally cylindrical outer casing is substantially perpendicular to the airflow.

16. The temperature sensor arrangement according to claim 15, wherein said air passage is a duct of an aircraft.

17. The temperature sensor arrangement according to claim 16, wherein said aircraft duct is part of an aircraft bleed air system.

18. The temperature sensor arrangement according to claim 11, wherein said generally cylindrical outer casing is formed of stainless steel.

19. The temperature sensor arrangement according to claim 1, wherein said pattern of air inflow passages is formed by drilling into said generally cylindrical outer casing.

20. The temperature sensor arrangement according to claim 11, wherein the air inflow passages in said generally cylindrical outer casing are equally spaced.

21. A temperature sensor arrangement comprising:
a sensor cavity, a temperature sensing element being positioned along a center line of said sensor cavity and generating a signal indicating temperature of air flowing thereto;
a generally cylindrical outer casing surrounding said sensor cavity, said outer casing including a pattern of air inflow passages for allowing air flow to said temperature sensing element in said sensor cavity so that said temperature sensing element senses temperature of air flowing generally transverse to said outer casing and entering said senor cavity via said pattern of air inflow passages, said pattern of air inflow passages overlapping said temperature sensing element in a direction extending radially from said center line of said sensor cavity, said direction being generally transverse to the direction of air flow to said temperature sensor arrangement, said air inflow passages being angled such that there is no direct line of air flow from an exterior of said outer casing to said sensing element; and
a front face on one end of said generally cylindrical outer casing, said front face including a pattern of openings for evacuating debris from said sensor cavity.

22. A temperature sensor arrangement comprising:
a sensor cavity, a temperature sensing element being positioned along a center line of said sensor cavity and generating a signal indicating temperature of air flowing thereto; and
a generally cylindrical outer casing surrounding said sensor cavity, said outer casing including a pattern of air inflow passages for allowing air flow to said temperature sensing element in said sensor cavity so that said temperature sensing element senses temperature of air flowing generally transverse to said outer casing and entering said senor cavity via said pattern of air inflow passages, said pattern of air inflow passages overlapping said temperature sensing element in a direction extending radially from said center line of said sensor cavity, said direction being generally transverse to the direction of air flow to said temperature sensor arrangement, said air inflow passages being angled such that there is no direct line of air flow from an exterior of said outer casing to said sensing element,
wherein said temperature sensor arrangement is configured to protrude into an air passage, such that said generally cylindrical outer casing is substantially perpendicular to the airflow.

23. A temperature sensor arrangement comprising:
a sensor cavity, a temperature sensing element being positioned along a center line of said sensor cavity and generating a signal indicating temperature of air flowing thereto;
a generally cylindrical outer casing surrounding said sensor cavity, said outer casing including a pattern of air inflow passages for allowing air flow to said temperature sensing element in said sensor cavity so that said temperature sensing element senses temperature of air flowing generally transverse to said outer casing and entering said senor cavity via said pattern of air inflow passages, said pattern of air inflow passages overlapping said temperature sensing element in a direction extending radially from said center line of said sensor cavity, said direction being generally transverse to the direction of air flow to said temperature sensor arrangement, said air inflow passages being offset relative to a center line of the housing cavity such that there is no direct line of air flow from an exterior of said outer casing to said sensing element; and a front face on one end of said generally cylindrical outer casing, said front face including a pattern of openings for evacuating debris from said sensor cavity.

24. A temperature sensor arrangement comprising:

a sensor cavity, a temperature sensing element being positioned along a center line of said sensor cavity and generating a signal indicating temperature of air flowing thereto; and a generally cylindrical outer casing surrounding said sensor cavity, said outer casing including a pattern of air inflow passages for allowing air flow to said temperature sensing element in said sensor cavity so that said temperature sensing element senses temperature of air flowing generally transverse to said outer casing and entering said senor cavity via said pattern of air inflow passages, said pattern of air inflow passages overlapping said temperature sensing element in a direction extending radially from said center line of said sensor cavity, said direction being generally transverse to the direction of air flow to said temperature sensor arrangement, said air inflow passages being offset relative to a center line of the housing cavity such that there is no direct line of air flow from an exterior of said outer casing to said sensing element, wherein said temperature sensor arrangement is configured to protrude into an air passage, such that said generally cylindrical outer casing is substantially perpendicular to the airflow.

* * * * *